United States Patent
Zavesky et al.

(10) Patent No.: US 11,265,387 B2
(45) Date of Patent: Mar. 1, 2022

(54) SYNCHRONIZING MULTIPLE USER DEVICES IN AN IMMERSIVE MEDIA ENVIRONMENT USING TIME-OF-FLIGHT LIGHT PATTERNS

(71) Applicant: AT&T Intellectual Property I, L.P., Atlanta, GA (US)

(72) Inventors: Eric Zavesky, Austin, TX (US); Lee Begeja, Gillette, NJ (US); David Crawford Gibbon, Lincroft, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 163 days.

(21) Appl. No.: 16/682,507

(22) Filed: Nov. 13, 2019

(65) Prior Publication Data
US 2021/0144220 A1 May 13, 2021

(51) Int. Cl.
*G06T 7/70* (2017.01)
*H04L 67/52* (2022.01)
*G06F 3/01* (2006.01)
*H04L 67/131* (2022.01)

(52) U.S. Cl.
CPC .............. *H04L 67/18* (2013.01); *G06F 3/011* (2013.01); *G06T 7/70* (2017.01); *H04L 67/38* (2013.01); *G06T 2207/30204* (2013.01); *G06T 2207/30244* (2013.01)

(58) Field of Classification Search
CPC ............. G06T 7/70; G06F 3/011; H04L 67/38
See application file for complete search history.

(56) References Cited

U.S. PATENT DOCUMENTS

| | | | |
|---|---|---|---|
| 2009/0065666 A1* | 3/2009 | Maningo | F16M 11/10 248/178.1 |
| 2010/0277655 A1* | 11/2010 | Sun | H04N 9/12 348/744 |
| 2011/0065496 A1* | 3/2011 | Gagner | G07F 17/3211 463/25 |
| 2013/0100009 A1* | 4/2013 | Willis | G06F 3/0425 345/156 |
| 2013/0190963 A1* | 7/2013 | Kuss | B60L 3/0015 701/23 |
| 2016/0163054 A1* | 6/2016 | Izadi | H04N 5/332 348/164 |
| 2017/0195647 A1* | 7/2017 | Honkanen | H04N 9/315 |
| 2020/0026348 A1* | 1/2020 | Nienstedt | A63F 13/65 |

* cited by examiner

*Primary Examiner* — Myron Wyche (57) ABSTRACT

In one example, a device, computer-readable medium, and method for synchronizing multiple user devices in an immersive media environment using time-of-flight (ToF) light patterns are provided. In one example, a method performed by a processing system of a first device includes detecting a fiducial that is present in a light pattern projected by a second device, wherein the second device is present in a same surrounding environment as the first device, determining an identity of the second device based on an appearance of the fiducial, identifying an expected orientation of the fiducial within the light pattern, based on the identity of the second device, and determining a location of the second device relative to the first device, based on an observed orientation of the fiducial relative to the expected orientation of the fiducial.

20 Claims, 4 Drawing Sheets

SYNCHRONIZING MULTIPLE USER DEVICES IN AN IMMERSIVE MEDIA ENVIRONMENT USING TIME-OF-FLIGHT LIGHT PATTERNS

The present disclosure relates generally to immersive media, and more particularly to devices, non-transitory computer-readable media, and methods for synchronizing multiple user devices in an immersive media environment using time-of-flight (ToF) light patterns.

BACKGROUND

Positional tracking systems are commonly used in immersive media applications including gaming, augmented reality, computer vision, and other applications. Some positional tracking systems operate on an "outside in" design, in which one or more tracking cameras (or other sensors) are placed around the device being tracked. In this case, the changing view(s) of the tracking camera(s) may be used to measure the device's changes in position. Other positional tracking systems operate on an "inside out" design, in which the tracking camera (or other sensor) is housed within the device being tracked. In this case, the device's position is tracked based on changes in the camera's perspective with respect to the surrounding environment. For instance, a head mounted display (HMD) used for virtual reality applications may utilize inside out positional tracking.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes a device, computer-readable medium, and method for synchronizing multiple user devices in an immersive media environment using time-of-flight (ToF) light patterns. In one example, a method performed by a processing system of a first device includes detecting a fiducial that is present in a light pattern projected by a second device, wherein the second device is present in a same surrounding environment as the first device, determining an identity of the second device based on an appearance of the fiducial, identifying an expected orientation of the fiducial within the light pattern, based on the identity of the second device, and determining a location of the second device relative to the first device, based on an observed orientation of the fiducial relative to the expected orientation of the fiducial.

In another example, a non-transitory computer-readable medium stores instructions which, when executed by a processing system of a first device including at least one processor, cause the processing system to perform operations. The operations may include detecting a fiducial that is present in a light pattern projected by a second device, wherein the second device is present in a same surrounding environment as the first device, determining an identity of the second device based on an appearance of the fiducial, identifying an expected orientation of the fiducial within the light pattern, based on the identity of the second device, and determining a location of the second device relative to the first device, based on an observed orientation of the fiducial relative to the expected orientation of the fiducial.

In another example, a first device includes a processing system including at least one processor and a non-transitory computer-readable medium. The non-transitory computer-readable medium stores instructions which, when executed by a processing system of a first device including at least one processor, cause the processing system to perform operations. The operations may include detecting a fiducial that is present in a light pattern projected by a second device, wherein the second device is present in a same surrounding environment as the first device, determining an identity of the second device based on an appearance of the fiducial, identifying an expected orientation of the fiducial within the light pattern, based on the identity of the second device, and determining a location of the second device relative to the first device, based on an observed orientation of the fiducial relative to the expected orientation of the fiducial.

As discussed above, some positional tracking systems operate on an "inside out" design, in which the tracking camera (or other sensor) is housed within the device being tracked. In this case, the device's position is tracked based on changes in the camera's perspective with respect to the surrounding environment. In some cases, the tracking system may have access to prior knowledge (e.g., three-dimensional models or maps) of the surrounding environment. In other cases, however, the tracking system may have no prior knowledge of the surrounding environment.

When no prior knowledge of the surrounding environment is available, an inside out positional tracking system may utilize time of flight (ToF) depth estimation to recognize objects in the surrounding environment. In this case, the positional tracking system may emit a short light pulse, where the light pulse projects a static, pre-trained pattern of (e.g., infrared) light into the surrounding environment. Objects in the surrounding environment may reflect the light, and the positional tracking system's sensor may record a return time at which the reflected light is detected by the sensor. The time difference between the emission of the light pulse and the return time of the reflected light may be used to determine the distances from the device to objects in the surrounding environment, to map the surrounding environment, and to track moving objects in the surrounding environment (including the device of which the positional tracking system is part).

While the patterns of light that are produced by most inside out positional tracking systems are robust enough for the positional tracking system to determine their own orientations, the positional tracking systems are generally not able to use the patterns of light to perform co-location with other devices which may also utilize inside out positional tracking systems. Moreover, since ToF does not utilize landmarks (e.g., barcodes or distinct object appearances that help to identify known locations within the surrounding environment), there are no real-world anchors that can be used to assist in co-location. Thus, in order to synchronize the positional tracking systems of two separate devices, a networking layer between the devices and a potentially expensive reconciliation engine are typically required.

Examples of the present disclosure embed unique fiducials into the patterns of light projected by devices including inside out positional tracking systems. The use of a unique fiducial allows the device projecting the fiducial to determine the extents its user viewpoint. In addition, by detecting unique fiducials projected by other devices in the same surrounding environment, the device may be able to detect the presences, identities, and/or locations of those other devices. Once other nearby devices have been detected and their locations determined, multiple devices may work together to improve the depth estimation calculations performed by any one of the devices operating individually. For instance, multiple devices may work together to extend the surface area covered by the patterns of light, or to project a denser collective pattern of light that allows for more accurate calculations to be made. These and other aspects of the present disclosure are described in greater detail below in connection with the examples of FIGS. 1-4.

Figure 1:
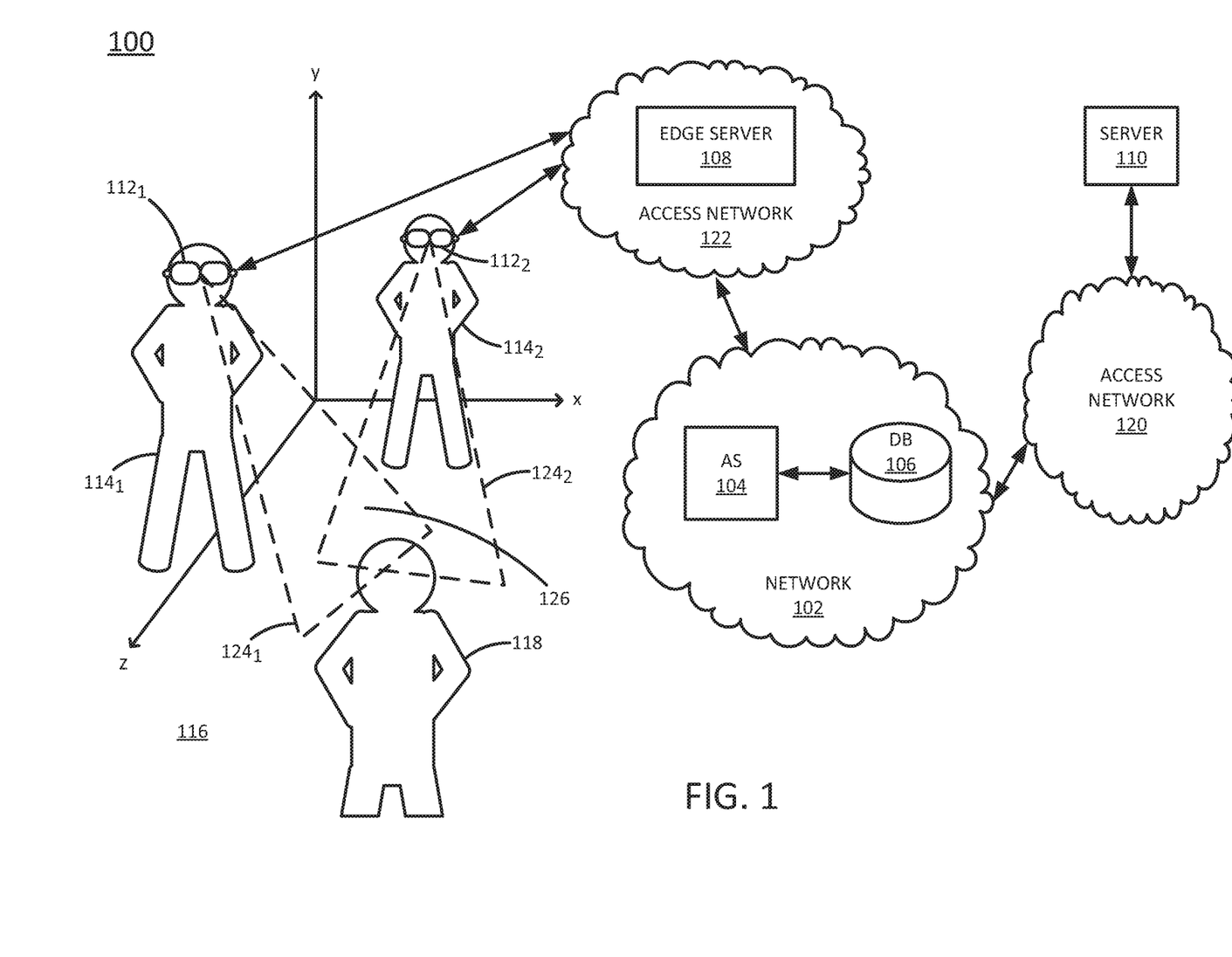
FIG. 1 illustrates an example network related to the present disclosure.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
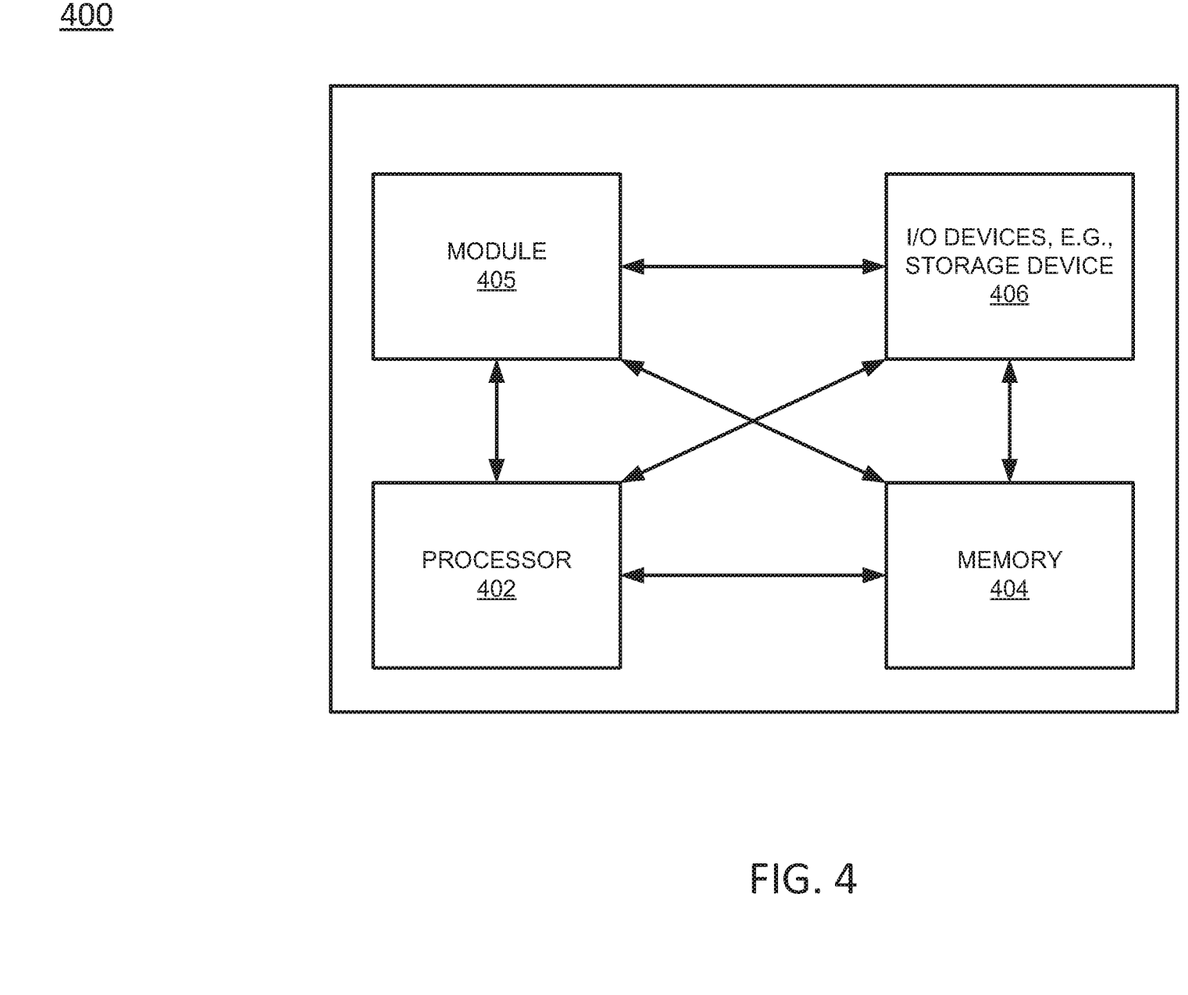
FIG. 4 illustrates a high level block diagram of a computing device specifically programmed to perform the steps, functions, blocks and/or operations described herein.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for anchor caching for extended reality applications. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for performing positional tracking of devices rendering immersive media (e.g., devices $112_1$-$112_2$, hereinafter individually referred to as a "device 112" or collectively referred to as "devices 112"). In one example, an application hosted on the AS 104 may perform computations in order to determine the position of a device 112 relative to an object in the environment surrounding the device 112. In one example, the computations may be based on data provided to the AS 104 by the device 112, such as a time at which the device 112 projected a light pattern into the surrounding environment and a time at which a sensor of the device detected a portion of the light pattern that was reflected back to the device 112. Thus, the application may compute the distance between the device and the object based on time of flight, as discussed above.

In another example, the object may be another device 112, and the computations may be based on the appearance and/or position of a unique fiducial in a light pattern projected by the other device 112. For instance, the application hosted on the AS 104 may perform image processing on images provided by a first device 112, where the images may depict light patterns that are projected into an environment surrounding the first device 112, as well as portions of light patterns that may be projected into the surrounding environment by a second device 112. In this case, the images may further include unique fiducials projected by the second device 112, which the application hosted on the AS 104 may extract using one or more character recognition techniques. The appearances and/or orientations of the fiducials may help the application hosted on the AS 104 to compute the position of the second device 112 relative to the first device, as described in greater detail with respect to FIG. 3.

In further examples still, the application hosted on the AS 104 may decode data that is encoded in a machine readable code, such as a quick response (QR) code, a bar code, or the like. In this case, the machine readable code may be a device's unique fiducial, as described above. Thus, the application hosted on the AS 104 may extract the fiducial from an image and then decode data that is encoded in the fiducial, such as parameters of the device that projected the fiducial (e.g., the throw distance of the device, the appearance of a light pattern projected by the device, the intensity of the light pattern projected by the device, or the like).

Additionally, the AS 104 may store an index, where the index maps a plurality of devices used to present immersive media (e.g., devices 112) to a plurality of unique fiducials associated with the devices. For instance, in one example, an index entry for a device may specify, for the device: device type (e.g., head mounted display, mobile phone, tablet computer, or the like), the types of connections used by the device to access immersive media (e.g., cellular or WiFi, etc.), information about the device's owner (e.g., the owner's name, the owner's relationship to owners of other devices in the index, etc.), the appearance (e.g., shape) of a unique fiducial that a positional tracking system of the device is configured to project, the orientation of the unique fiducial within a light pattern that is projected by the positional tracking system (e.g., a specific corner, side, or center of the light pattern), and/or other information. In one example, index entries for the devices 112 may be stored on an opt-in basis, i.e., the user of a device that is capable of rendering immersive media (e.g., a head mounted display, a mobile phone, or the like) may choose whether or not to register the device with the AS 104. In a further example, the index entries for the devices 112 may be stored in encrypted form to protect any user or device information that may be deemed private. In a further example, any of the information stored in the index could also be encoded in a machine readable code that is projected by a device, as described above.

In one example, the DB 106 may store the index, and the AS 104 may retrieve the index from the DB 106 when needed. For ease of illustration, various additional elements of network 102 are omitted from FIG. 1.

Figure 3:
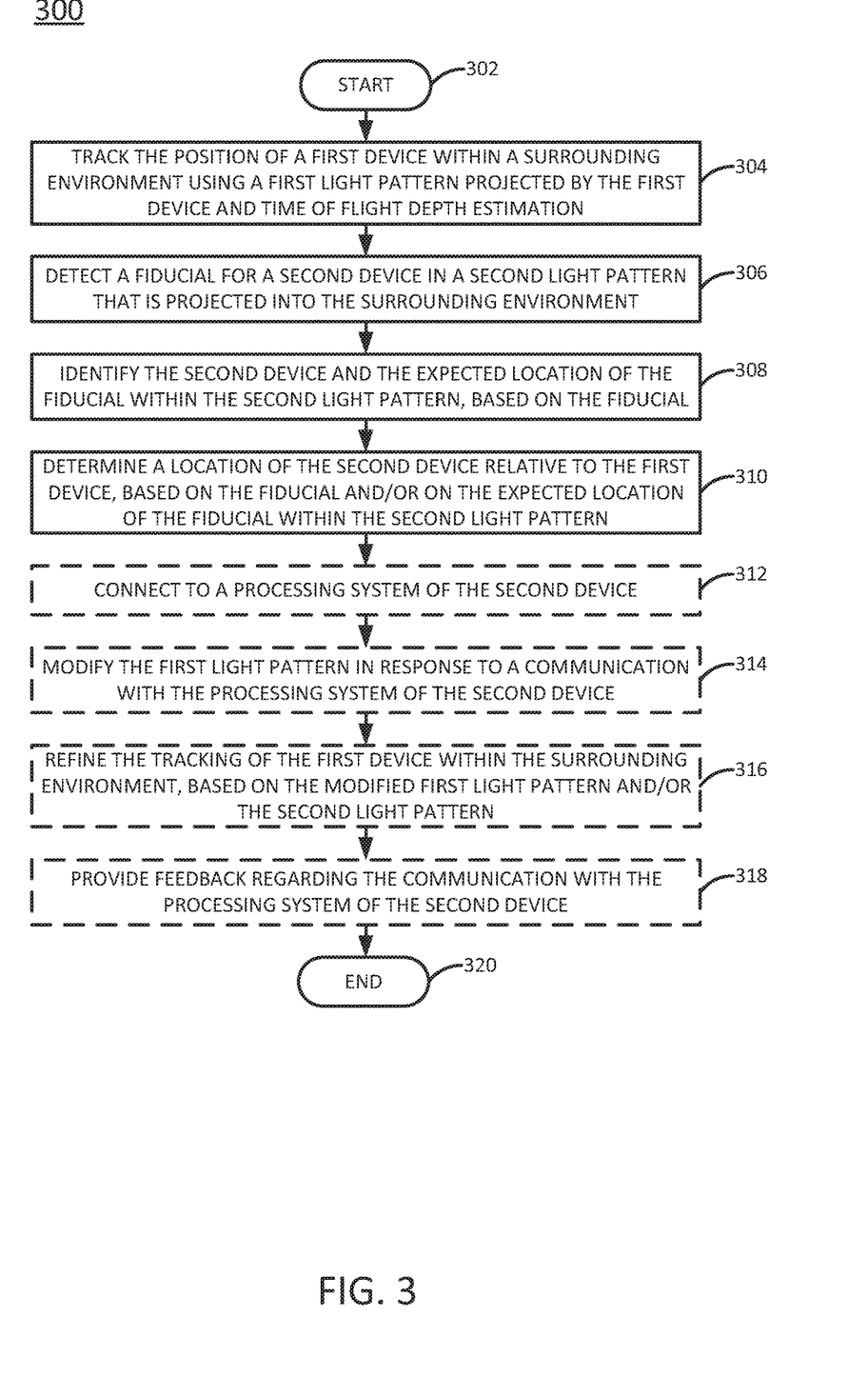
FIG. 3 illustrates a flowchart of an example method for synchronizing first and second devices in an immersive media environment using time of flight light patterns, in accordance with the present disclosure.

In one example, access network 122 may include an edge server 108, which may comprise a computing system or server, such as computing system 400 depicted in FIG. 4, and may be configured to provide one or more operations or functions for synchronizing multiple users in an immersive media environment using time-of-flight (ToF) light patterns, as described herein. For instance, an example method 300 for synchronizing multiple users in an immersive media environment using time-of-flight (ToF) light patterns is illustrated in FIG. 3 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., devices $112_1$-$112_2$ (hereinafter individually referred to as a "device 112" or collectively referred to as "devices 112"). Access networks 120 and 122 may transmit and receive communications between server 110, devices 112, application server (AS) 104, other components of network 102, devices reachable via the Internet in general, and so forth. In one example, each device 112 may comprise a mobile device, a cellular smart phone, a wearable computing device (e.g., smart glasses, a virtual reality (VR) headset or other type of head mounted display, or the like), a laptop computer, a tablet computer, or the like. In one example, each device 112 may comprise a computing system or device, such as computing system 400 depicted in FIG. 4, and may be configured to provide one or more operations or functions in connection with examples of the present disclosure for synchronizing multiple users in an immersive media environment using time-of-flight (ToF) light patterns. In a further example, each device 112 may further include a positional tracking system, e.g., an inside out positional tracking system that tracks the movements of the device by projecting a light pattern into an environment 116 surrounding the device 112, as discussed above.

In one example, server 110 may comprise a network-based server for performing positional tracking of devices rendering immersive media. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an immersive media system operated by an entity that is not a telecommunications network operator. For instance, a provider of an immersive media system may operate server 110 and may also operate edge sever 108 in accordance with an arrangement with a telecommunication service provider offering edge computing resources to third-parties. However, in another example, a telecommunication network service provider may operate network 102 and access network 122, and may also provide an immersive media system via AS 104 and edge server 108. For instance, in such an example, the immersive media system may comprise an additional service that may be offered to subscribers, e.g., in addition to network access services, telephony services, traditional television services, and so forth.

In an illustrative example, an immersive media system may be provided via AS 104 and edge server 108. In one example, a user, such as a user $114_1$ or $114_2$ (hereinafter individually referred to as a "user 114" or collectively referred to as "users 114") in FIG. 1, may engage an application on a respective device 112 to establish one or more sessions with the immersive media system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between device 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, device 112 may communicate with access network 122, network 102, the Internet in general, etc., via a WLAN that interfaces with access network 122.

In the example of FIG. 1, a device 112 may establish a session with edge server 108 for performing positional tracking and/or synchronizing an immersive media experience with the experience of another device 112. For illustrative purposes, the immersive media experience may take place within an example real world location 116, such as a museum. For instance, a first user $114_1$ and a second user $114_2$ may use respective devices $112_1$ and $112_2$ (e.g., depicted in FIG. 1 as head mounted displays) to view an object 118, where the object 118 may be an exhibit in the museum such as a statue. The devices 112 may provide immersive content related to the object 118. For instance, the devices 112 may provide extended reality (e.g., augmented reality or mixed reality) content by superimposing informational text and/or images about the object on the displays of the devices 112.

However, the first user $114_1$ and the second user $114_2$ may be standing in different locations (e.g., at different x,y,z positions) relative to the object 118. As such, the first device $112_1$ will view the object 118 from a different perspective than the second device $112_2$. The first device $112_1$ may also project a first light pattern $124_1$ into the real world location 116, where a portion of the first light pattern may fall on a first surface of the object 118 and be reflected back to the first device $112_1$. Similarly, the second device $112_2$ may project a second light pattern $124_2$ into the real world location 116, where a portion of the second light pattern may fall on a second surface of the object 118 and be reflected back to the second device $112_2$. Individually, the first light pattern $124_1$ and the second light pattern $124_2$ may be referred to simply as a "light pattern 124;" collectively, the first light pattern $124_1$ and the second light pattern $124_2$ may be referred to as "light patterns 124." Applications executing on the devices 112 and/or on a remote server (e.g., AS 104, edge server 108, and/or server 110) may track the movements of the devices 112 based on time of flight, as discussed above.

Depending upon the locations of the first and second users 114 and on the ranges of the first and second light patterns 124, the first light pattern $124_1$ may overlap to some degree with the second light pattern $124_2$, as shown by the overlap 126 in FIG. 1. In this case, it may be possible for the first device $112_1$ to detect the presence and/or relative location of the second device $112_2$, and vice versa.

Figure 2:
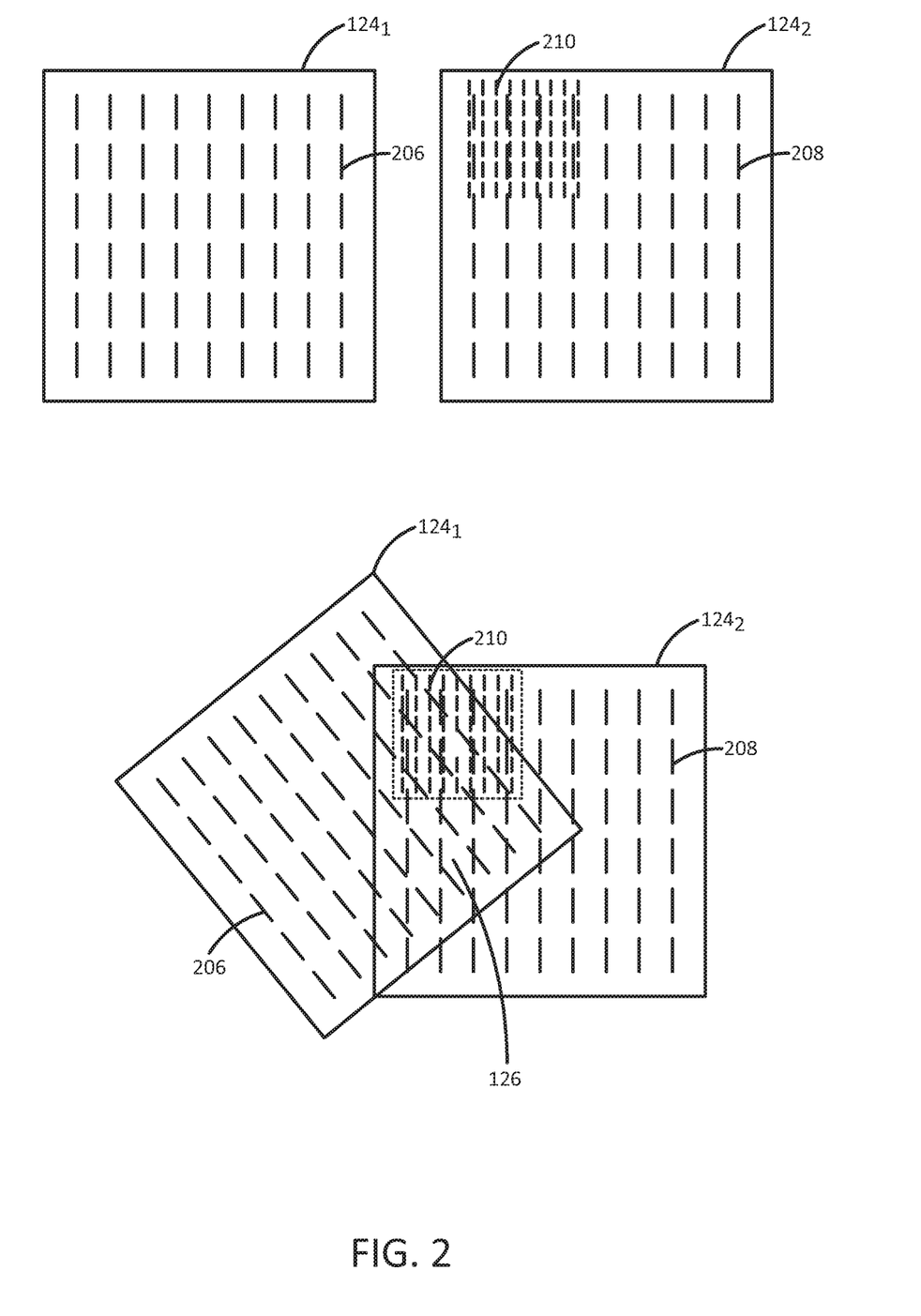
FIG. 2 illustrates example first and second light patterns that may be projected by the positional tracking systems of the first and second devices, respectively, of FIG. 1.

For instance, FIG. 2 illustrates example first and second light patterns $124_1$ and $124_2$ that may be projected by the positional tracking systems of the first and second devices $112_1$ and $112_2$, respectively, of FIG. 1. As illustrated, the first light pattern $124_1$ may comprise a first series of dots 206, while the second light pattern $124_2$ may comprise a second series of dots 208. Although the example light patterns 124 are described as comprising series of dots, it will be appreciated that the light patterns 124 may comprise series of other shapes as well, such as dashes, x's, or other shapes. Moreover, although the first series of dots 206 and the second series of dots 208 are illustrated as generally forming grid patterns, the first series of dots 206 and the second series of dots 208 may be arranged in other patterns without departing from the scope of the present disclosure.

In one example, at least one of the light patterns 124 (i.e., the second light pattern $124_2$ in the example of FIG. 2) may additionally include a unique fiducial 210. The unique fiducial may comprise an arrangement of dots to form a unique pattern, character, or marking that is different from the remainder of the light pattern 124. For instance, the fiducial 210 may comprise a spacing of dots that is denser than the spacing in the light pattern 124 as a whole. In one example, as discussed above, the fiducial 210 may comprise a machine readable code. In one example, the fiducial 210 is always projected in the same orientation and location in the light pattern 124 (e.g., in the top left corner in the example of FIG. 2).

When the first light pattern $124_1$ and the second light pattern $124_2$ overlap, at least a portion of the fiducial 210 may be visible to the first device $112_1$. If enough of the fiducial 210 is visible to the first device $112_1$, the first device $112_1$ (or the first device $112_1$ working in conjunction with a remote server, such as the AS 104, edge server 108, or server 110), the first device $112_1$ may be able to determine the identity and/or relative location of the second device $112_2$ (e.g., "Device X is present," or "Device X is positioned y feet to the left"). Moreover, once the presence and location of the second device $112_2$ is detected, the first device $112_1$ and the second device $112_1$ may connect to each other. The connection may allow the first device $112_1$ and the second device $112_2$ to share information, e.g., to present a shared immersive experience or to contribute to data about the real world location 116 that is being collected (such as a map that is being generated). Furthermore, the shared information could be used to refine the respective immersive experiences being presented on each device. For instance, data provided by the second device $112_2$ may help the first device $112_1$ to compute distances to certain objects more accurately, and therefore improve the overall immersive experience being presented by the first device $112_1$. As an example, combining two light patterns projected by two different devices into the same space allows the density of the pattern coverage in that space to be increased, which may allow for more accurate distance computations. For instance, denser pattern coverage may help to overcome obstacles to ToF computations, such as less than ideal lighting conditions (e.g., shadows and/or dim lighting).

Thus, the quality of immersive media that is generated by the devices 112 may be improved with potentially minimal change to the respective positional tracking systems (e.g., minor modifications to add fiducials to projected light patterns). Moreover, the devices 112 need not be of the same type, make, or model, or even of the same underlying technology platform, to enable interoperation. In addition, no central server is needed to facilitate discovery of and cooperation with nearby devices 112, although in some examples a server may assist in recognizing fiducials and/or computing distances (e.g., if the processing power of a device 112 is limited).

It should be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 3 illustrates a flowchart of an example method 300 for synchronizing first and second devices in an immersive media environment using time of flight light patterns, in accordance with the present disclosure. In one example, the method 300 is performed by a component of the system 100 of FIG. 1, such as by one of the devices 112, and/or any one or more components thereof (e.g., a processor, or processors, performing operations stored in and loaded from a memory), or by one of the devices 112 in conjunction with one or more other devices, such AS 104, server 106, edge server 108, and so on. In one example, the steps, functions, or operations of method 300 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system.

The method 300 begins in step 302 and may proceed to step 304. In step 304, the processing system may track the position of a device of which the processing system is a part (hereinafter referred to as the "first device"), using ToF depth estimation. As discussed above, ToF depth estimation may be used to recognize objects in an environment surrounding the first device. For instance, the processing system may cause a light source (e.g., an infrared light source) of the first device to emit a short light pulse, where the light pulse projects a first light pattern into the surrounding environment. Objects in the surrounding environment may reflect the light, and a sensor of the first device may record a return time at which the reflected light is detected by the sensor. The time difference between the emission of the light pulse and the return time of the reflected light may be used to determine the distances from the first device to objects in the surrounding environment, to map the surrounding environment, and to track moving objects in the surrounding environment (including the first device itself). The processing system may perform the distance computations locally, or the processing system may provide raw data (e.g., time differences) to a remote device, such as a server, which performs the distance computations and provides the results of the distance computations to the processing system.

In step 306, the processing system may detect a fiducial for a second device in a second light pattern that is visible to the sensor of the first device. In other words, the processing system detects a second light pattern that is present in the surrounding environment, but that is projected from a device other than the first device. Moreover, within the second light pattern, the processor detects a fiducial, or a unique marking, that identifies the second pattern as being associated with or projected by the second device. For instance, a remote database (such as the DB 106 of FIG. 1) may maintain an index that identifies known fiducials and the devices associated with the known fiducials. A local memory of the first device may also store a temporary, limited index that identifies the fiducials of devices that the first device has encountered within some predefined threshold time (e.g., within the current immersive experience, with the last x hours or days, etc.).

In a further example, the database may also indicate a known or expected location and orientation for a known fiducial. For instance, a particular device may project a light pattern that includes a unique marking placed in a specific orientation and location (e.g., a specific side or corner of the light pattern, a center of the light pattern, etc.). Every time the particular device projects the light pattern, the unique marking always appears in the same specific orientation and location. If the specific orientation and location for the unique marking is known (or accessible) to the processing system of the first device, then the processing system may be able to determine the location of the second device from the orientation and location of the unique marking. By varying the location and orientation, a single fiducial may be used to uniquely identify a plurality of devices. For instance, a first light pattern may place the fiducial in a first location (e.g., top left corner), while a second light pattern may place the fiducial in a different, second location (e.g., center).

In a further example, the fiducial for the second device may encode certain parameters for the second device. For instance, the fiducial may comprise a machine readable code, such as a QR code, a bar code, or the like. The machine readable code may be used to encode parameters of the second device such as the throw distance (e.g., the minimum or maximum distance to which the second device can project the second light pattern without the second light pattern becoming distorted), the appearance of the second light pattern, the intensity of the second light pattern, and the like.

In one example, the processing system may extract the fiducial from the second light pattern (e.g., using character recognition or other image processing techniques). However, in another example, the processing system may send an image of the second light pattern to a remote server, where the remote server may extract the fiducial and provide the extracted fiducial to the processing system in step 306.

In step 308, the processing system may identify the second device and the expected orientation of the fiducial in the second light pattern, based on the fiducial detected in step 306. For instance, as discussed above, the processing system may perform a lookup in a database based on the appearance of the fiducial, where the database maintains an index of known fiducials and the devices associated with the known fiducials. In another example, the fiducial may comprise a machine readable code from which the processing system may decode the identification of the second device and the expected orientation of the fiducial in the second light pattern. Optionally, the processing system may also look up or decode additional parameters of the second device based on the fiducial, as discussed above.

In another example, a remote server may perform the lookup of the fiducial or may read the machine readable code. In this case, the server may provide the information associated with the fiducial (e.g., identification of the second device and the expected orientation and location of the fiducial within the second light pattern, as well as other data including device parameters of the second device) to the processing system in step 308.

In step 310, the processing system may determine the location of the second device with respect to the first device, based on the fiducial detected in step 306. In one example, the location of the second device with respect to the first device is determined using an inverse homography. A homography is an image transformation in which a matrix may be used to map coordinates in a two-dimensional image plane viewed by a camera to corresponding three-dimensional positions in the real world (which can be expressed in camera coordinates). The matrix incorporates the camera characteristics such as focal length, optical center, and extrinsic parameters (e.g., rotation and translation). The inverse homography is the inverse of the matrix used to map between the two-dimensional plane and the three-dimensional positions.

In one example, if the location of the first device is already known (e.g., based on the tracking performed in step 304), the processing system may determine the location of the second device based on the orientation and the location of the fiducial in the second light pattern. For instance, the observed orientation of the fiducial (e.g., as observed in step 306) relative to the expected location and orientation of the fiducial may allow for the computation of the second device's location. In another example, if the second light pattern includes more than one fiducial, the processing system may determine the location of the second device using keystone correction (e.g., deformation from the topology of the surrounding environment) and a higher precision inverse homography.

In further examples, where the surrounding environment includes anchors (i.e., devices that are placed within the surrounding environment and that can communicate with the processing system using near field communications or a similar protocol), the processing system may use information about the known locations of the anchors to help determine the location of the second device. In this case, the processing system may be able to determine the second device's location without having to access a remote device such as a server or database. Thus, the processing system may be able to determine the second device's location even when network conditions may be poor.

In another example, a remote server may determine the location of the second device relative to the first device, based on images and/or time of flight data (e.g., time at which the first light pattern was projected and time at which a sensor detected reflection of the first light pattern) provided by the processing system. In this case, the remote server may provide the location information to the processing system in step 310.

In optional step 312 (illustrated in phantom), the processing system may connect to a processing system of the second device. In one example, the processing system may use a unique identifier (e.g., an IP address, a media access control address, or the like) of the second device (e.g., as stored in a database or encoded in the fiducial detected in step 306). For instance, the processing system of the first device and the processing system of the second device may communicate via a peer to peer connection, via a mesh network, or via a cloud network using identifiers that may be embedded in their respective fiducials.

In optional step 314 (illustrated in phantom), the processing system may modify the first light pattern in response to communicating with the processing system of the second device. For instance, in one example, either or both of the processing system of the first device and the processing system of the second device may refine its respective light pattern to reduce interference with the other. In further examples, the processing system of the first device and the processing system of the second device may cooperate by projecting their respective light patterns simultaneously to generate a combined light pattern that covers a greater surface area of the surrounding environment, that improves the resolution of the light pattern(s) projected individually into the surrounding environment (e.g., by providing denser coverage), or that improves tracking and/or mapping within the surrounding environment in some other way.

In optional step 316, the processing system may refine the tracking of the position of the first device within the surrounding environment, based on the modified first light pattern and/or the second light pattern. For instance, as discussed above, when the first light pattern and the second light pattern are combined or overlap within the surrounding environment, the combined light pattern may provide denser coverage in the area of overlap, allowing for more accurate computations of distance. In another example, the combined light pattern may cover a greater surface area within the surrounding environment than the surface area covered by the first light pattern alone, or may provide greater coverage in spaces that are dimly lit.

In optional step 318 (illustrated in phantom), the processing system may provide feedback regarding the communication with the processing system of the second device to a centralized computing device, such as a server. The feedback may include, for example, the respective light patterns emitted by the first and second devices that work best together (e.g., that best accomplish some predefined objective when projected simultaneously), the identifiers of other devices located within some predefined threshold distance of the first device, or the like. The centralized device may use the feedback (which may similarly be provided by the processing system of the second device) to improve future immersive media experiences in which the first device and/or the second device may participate. In another example, the centralized computing device may host a gaming application, and the feedback may be used to enhance a gaming experience for the first device and/or the second device.

The method 300 may end in step 320. Alternatively, the method 300 may return to step 304, and may repeat steps 304-318 continuously for as long as the user is utilizing the first device (or until the processing system receives a signal from the user to stop presenting immersive media, until the first device is powered down, etc.). Thus, the position of the first device within the surrounding environment may be continuously tracked, and the tracking may be refined using data provided by the second device when possible. Additionally, although the discussion of the method 300 makes reference to a first device and a second device, it will be appreciated that any number of devices may be present within the surrounding environment. Thus, positional tracking of the first device may be enhanced using information from any number of other devices that include similar inside out positional tracking systems.

Further examples of the method 300 may be used to facilitate backup communications, e.g., when network conditions are poor. For instance, if the first device is unable to connect to a remote server over a network to download data, the first device may be able to detect the presence of a nearby second device from which the first device can obtain the data (e.g., using near field communications or another short-range communication protocol). Further examples of the present invention may be extended to vehicles such as cars, scooters, bicycles, and the like. In this case, observation of light patterns including unique fiducials may allow a system such as a municipal-run system to detect when a specific vehicle is somewhere that the vehicle should not be (e.g., parked in a zone for which the vehicle is not authorized, traveling beyond a permissible geographic boundary, etc.).

Further examples still may allow users of different devices to collaborate opportunistically on mutual tasks. For instance, a plurality of users using a plurality of different devices could cooperate to perform three-dimensional depth estimation in a specific space, and, depending on the capabilities of the respective devices, could assign different tasks to each other (e.g., one device collects high resolution images, another device provides large surface area coverage, etc.).

In further examples, the unique fiducials projected in the light patterns could be used to trigger actions by Internet of Things (IoT) devices, such as smart security systems, smart thermostats, smart lighting systems, and the like. For instance, a first device may comprise a sensor positioned near the entrance to a user's home. When the first device detects a unique fiducial that is projected by the user's mobile device, the sensor may send a signal to another device (e.g., a locking mechanism) that allows the user to enter the home.

It should be noted that the method 300 may be expanded to include additional steps, or may be modified to replace steps with different steps, to combine steps, to omit steps, to perform steps in a different order, and so forth. For instance, as discussed above, in one example the processing system may repeat one or more steps of the method 300, such as steps 304-3310, steps 304-318, etc. In another example, the method 300 may include storing one or more items of data, e.g., at the first device or at an edge server. The storing may be after step 320. For instance, the first device may temporarily (and locally) store information (e.g., fiducials, identifiers, etc.) regarding devices that have been detected nearby during a single immersive experience, which may allow the first device to detect when these devices are encountered again during the immersive experience without having to connect to a remote server or database. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1, or described in connection with the method 300 of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for synchronizing first and second devices in an immersive media environment using time of flight light patterns, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for synchronizing first and second devices in an immersive media environment using time of flight light patterns (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for synchronizing first and second devices in an immersive media environment using time of flight light patterns (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:
   detecting, by a processing system of a first device, a fiducial that is present in a light pattern projected by a second device, wherein the second device is present in a same surrounding environment as the first device;
   determining, by the processing system, an identity of the second device based on an appearance of the fiducial;
   identifying, by the processing system, an expected orientation of the fiducial within the light pattern, based on the identity of the second device;
   determining, by the processing system, a location of the second device relative to the first device, based on an observed orientation of the fiducial relative to the expected orientation of the fiducial;
   connecting, by the processing system, to a processing system of the second device;
   modifying, by the processing system and in response to the connecting, a light pattern projected by the first device into the surrounding environment, wherein the modifying comprises combining the light pattern projected by the first device with the light pattern projected by the second device to generate a combined light pattern; and
   refining, by the processing system, an estimate of a position of the first device within the surrounding environment, wherein the refining is based on an observation of the combined light pattern.

2. The method of claim 1, wherein the processing system is part of a positional tracking system of the first device, and wherein the positional tracking system tracks a position of the first device in the surrounding environment based on a time of flight depth estimation.

3. The method of claim 1, wherein the appearance of the fiducial is unique to the second device.

4. The method of claim 1, wherein the appearance of the fiducial and the expected orientation of the fiducial within the light pattern are unique to the second device.

5. The method of claim 1, wherein the fiducial comprises a machine readable code.

6. The method of claim 5, wherein the machine readable code encodes the identity of the second device.

7. The method of claim 6, wherein the machine readable code further encodes at least one of: the expected orientation of the fiducial within the light pattern projected by the second device, a throw distance of the second device, an appearance of the light pattern projected by the second device, or an intensity of the light pattern projected by the second device.

8. The method of claim 1, wherein the location of the second device relative to the first device is determined using an inverse homography.

9. The method of claim 1, wherein the fiducial is one of a plurality of fiducials detected in the light pattern projected by the second device, and the location of the second device relative to the first device is determined using a keystone correction.

10. The method of claim 1, wherein the processing system connects to the processing system of the second device using a device identifier that is associated with the fiducial.

11. The method of claim 1, wherein the modifying further comprises modifying the light pattern projected by the first device to reduce interference with the light pattern projected by the second device.

12. The method of claim 1, wherein the combined light pattern covers a larger surface area in the surrounding environment than the light pattern projected by the first device or the light pattern projected by the second device individually.

13. The method of claim 1, wherein the combined light pattern provides a denser pattern than the light pattern projected by the first device or the light pattern projected by the second device individually.

14. The method of claim 1, further comprising:
providing, by the processing system, feedback to a centralized device regarding a usage of the combined light pattern.

15. A non-transitory computer-readable medium storing instructions which, when executed by a processing system of a first device including at least one processor, cause the processing system to perform operations, the operations comprising:
detecting a fiducial that is present in a light pattern projected by a second device, wherein the second device is present in a same surrounding environment as the first device;
determining an identity of the second device based on an appearance of the fiducial;
identifying an expected orientation of the fiducial within the light pattern, based on the identity of the second device;
determining a location of the second device relative to the first device, based on an observed orientation of the fiducial relative to the expected orientation of the fiducial;
connecting to a processing system of the second device;
modifying, in response to the connecting, a light pattern projected by the first device into the surrounding environment, wherein the modifying comprises combining the light pattern projected by the first device with the light pattern projected by the second device to generate a combined light pattern; and
refining an estimate of a position of the first device within the surrounding environment, wherein the refining is based on an observation of the combined light pattern.

16. A first device, comprising:
a processing system including at least one processor; and
a non-transitory computer-readable medium storing instructions which, when executed by the processing system, cause the processing system to perform operations, the operations comprising:
detecting a fiducial that is present in a light pattern projected by a second device, wherein the second device is present in a same surrounding environment as the first device;
determining an identity of the second device based on an appearance of the fiducial;
identifying an expected orientation of the fiducial within the light pattern, based on the identity of the second device;
determining a location of the second device relative to the first device, based on an observed orientation of the fiducial relative to the expected orientation of the fiducial;
connecting to a processing system of the second device;
modifying, in response to the connecting, a light pattern projected by the first device into the surrounding environment, wherein the modifying comprises combining the light pattern projected by the first device with the light pattern projected by the second device to generate a combined light pattern; and
refining an estimate of a position of the first device within the surrounding environment, wherein the refining is based on an observation of the combined light pattern.

17. The non-transitory computer-readable medium of claim 15, wherein the processing system is part of a positional tracking system of the first device, and wherein the positional tracking system tracks a position of the first device in the surrounding environment based on a time of flight depth estimation.

18. The non-transitory computer-readable medium of claim 15, wherein the combined light pattern covers a larger surface area in the surrounding environment than the light pattern projected by the first device or the light pattern projected by the second device individually.

19. The non-transitory computer-readable medium of claim 15, wherein the combined light pattern provides a denser pattern than the light pattern projected by the first device or the light pattern projected by the second device individually.

20. The first device of claim 16, wherein the processing system is part of a positional tracking system of the first device, and wherein the positional tracking system tracks a position of the first device in the surrounding environment based on a time of flight depth estimation.

* * * * *